Dec. 31, 1957     I. R. HARRIS     2,818,144
BRAKE BEAM STRUT
Filed Jan. 18, 1955     2 Sheets-Sheet 1
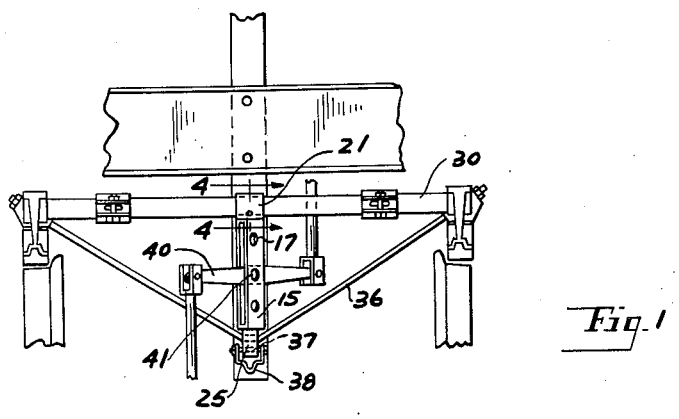
Fig. 1
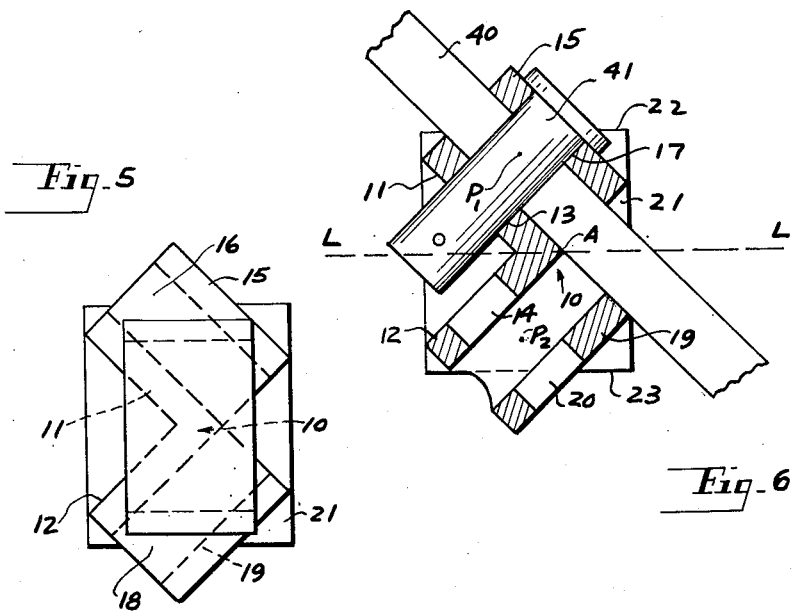
Fig. 5
Fig. 6
INVENTOR.
ISAAC R. HARRIS.
BY Louis Chayfka
ATTORNEY Dec. 31, 1957   I. R. HARRIS   2,818,144
BRAKE BEAM STRUT Filed Jan. 18, 1955   2 Sheets-Sheet 2

INVENTOR.
ISAAC R. HARRIS.
BY
Louis Chayka
ATTORNEY.

United States Patent Office 2,818,144
Patented Dec. 31, 1957

2,818,144

BRAKE BEAM STRUT

Isaac R. Harris, Detroit, Mich.

Application January 18, 1955, Serial No. 482,485

2 Claims. (Cl. 188—229.6)

The improvement pertains to a strut which forms a part of a mechanism for the operation of the brakes. A strut of the kind to be described herein is connected to a brake beam which is equipped with brake shoes for application to the wheels of a respective railroad car, and serves as a means for support of a lever for the operation of said brake beam.

According to the present practice, the strut may be used for support of what is known as a left-hand lever or a right-hand lever, and both kinds have to be used at the same time for application to different sets of wheels of the same car.

In view of the above, a number of inventions have been made whereby a strut could be used either for the left-hand or the right-hand lever, as needed. However, some of such struts, or fulcrums as they are called, are made in such a manner that they have to be used in one position for the right-hand lever but include parts which have to be reversed longitudinally in order to be adapted for use with a left-hand lever. In other cases, for the same purpose a strut has to be turned about its axis, while in some instances such a reversal of an element of a strut will change the distance of the pivotal position of the lever from the brake beam.

A reversal of parts of the strut involves unnecessary labor and encounters difficulties when the component parts have corroded or frozen in place. A change of distance from the pivotal axis of the lever, as just described, affects the efficiency of the brakes.

It is, therefore, the object of this improvement to provide a strut which (1) will be made in one piece and which, therefore, will eliminate the need of adjusting the relative positions of its component parts, (2) will be adapted to be used either for left-hand or right-hand levers in such a manner that the pivotal axis of the lever will be at the same distance for the left-hand or right-hand position.

I shall now describe the improvement with reference to the accompanying drawings in which:

Fig. 1 is a plan view of a brake beam assembly in a railroad car, the assembly including a strut of my invention;

Fig. 5 is an enlarged end view of a strut shown in Fig. 3;

Fig. 6 is an enlarged sectional view of a strut on line 6—6 of Fig. 3, the view including a part of a brake lever fulcrumed therein.

Similar numerals refer to similar parts throughout the several views.

Figure 2:
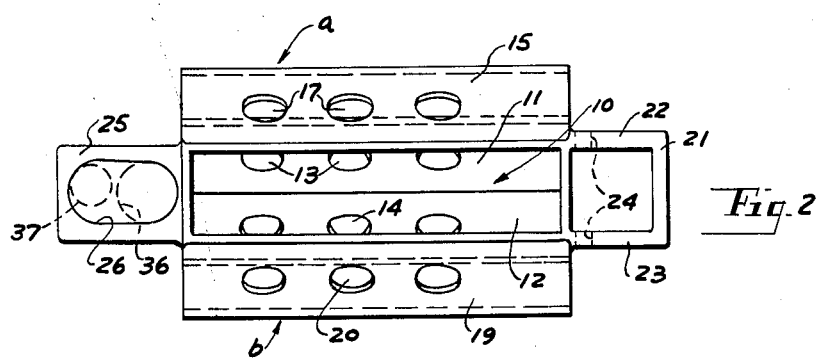
Fig. 2 is a side elevational view of the strut.
Figure 3:
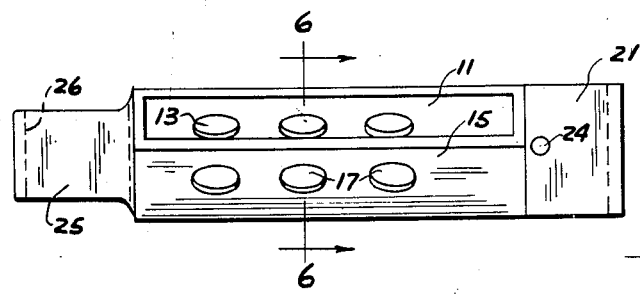
Fig. 3 is a top elevational view thereof.

The structure of the strut will be best understood by referring to Figs. 5 and 6. As shown there, the strut includes a V-shaped rail generally identified by numeral 10, the rail being composed of two longitudinal flanges, 11 and 12, integrally connected to each other lengthwise in a right-angle relation to each other.

It will be noted that the V-shaped rail 10 is to be disposed horizontally in such a manner that the apex A of the V formation will be on a horizontal line L—L, while flange 11, called the upper flange, will extend from said apex at 45 degrees upwardly over said line, and the other, or lower, flange will slant downwardly from said horizontal line at the same angle of 45 degrees.

Each of the flanges has a number of apertures longitudinally spaced from each other, the apertures in flange 11 being marked 13, while the apertures in flange 12 are marked 14. It must be added here that the apertures in one flange are alined with the apertures in the other flange.

Disposed parallel to flange 11 is a plate 15 which is substantially of the same length, width, and thickness as said flange 11, and which is, at each end, connected to said flange by means of a transverse wall 16. The plate contains a number of longitudinally-spaced apertures 17, said apertures being longitudinally spaced from each other and being in alinement with similar apertures in said flange 11.

Similarly, flange 12 is connected at each end, by means of a transverse wall 18, to a plate 19 which is substantially of the same thickness, width, and length as said flange 12, and which is provided with a plurality of apertures 20 in alinement with apertures 14 in said flange 12.

Integrally connected to one end of said V-shaped member 10 and to the transverse walls 16 and 18 is a box channel 21 which in its operative position includes a horizontal top wall 22 and a parallel bottom wall 23, each of which walls is provided with an aperture 24, the two apertures being alined vertically.

Connected to the other end of said V-shaped rail 10 and the transverse walls 16 and 18, is an oblong member 25, the member having therein a horizontally-disposed opening 26.

Figure 4:
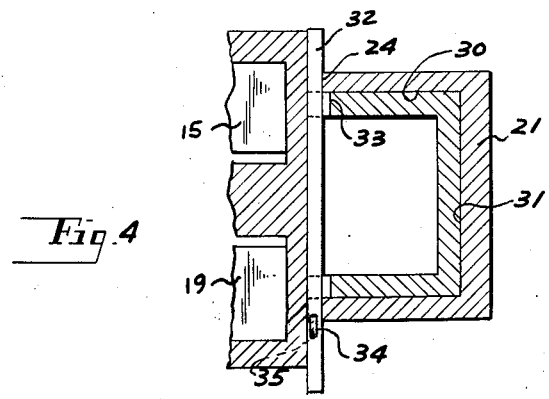
Fig. 4 is an enlarged sectional view on line 4—4 of Fig. 1.

For its operative use the strut is secured at one end to a brake beam 30. This is effected by means of said box channel 21 which has an opening large enough to embrace said brake beam which is disposed transversely within said box channel. To prevent lateral movement of the strut upon said beam, a pin 32 is inserted into the openings 24 in said box channel 21, the pin fitting into a pair of notches or recesses 33 in said beam, as best shown in Fig. 4. A cotter pin 34, passing through a hole 35 in the lower end portion of the pin, prevents the withdrawal of the pin upwardly.

Connected at its end to the end portions of the brake beam 30 is a V-shaped rod 36, the rod being positioned horizontally so that the apex portion of the V-formation of the rod will pass through the opening 26 in said member 25. Also secured to said member 25, by means of a transverse pin 37 passing through the same opening 26, is a loop 38 by means of which the strut at this end is suspended by a chain from the frame of the car.

Disposed horizontally under the frame of the car, and at one end attached to a brake beam 30, while its other end is suspended by a chain from the frame of the car, as just described, the strut may be used for support of a right-hand lever or left-hand lever. A lever, so mounted within the strut, is marked 40 and is shown in Figs. 1 and 6.

As the lever is to be fulcrumed within the strut, it is provided with an aperture, midway its length, for reception of a pin 41 which, as shown in Fig. 6, fits into the alined apertures 17 and 13 in plate 15 and the flange 11, respectively, the lever shown in Fig. 6 is a left-hand lever, as its upper end extends to the left of the strut. For use with the right-hand lever, the strut would have to be turned 180 degrees from the position shown in Fig. 6 so that flange 12 would form the upper flange and flange 11 would serve as a lower flange. The right-hand lever would fit into the space between the lower flange 12 and the plate 19, and would be fulcrumed by means of a pin similar to pin 41 passing through apertures 14 and 20, respectively.

Attention is invited to the fact that the point P–1 at which the longitudinal axis of the pin 41 and the median line of the lever 40 in the left-hand lever will cross each other lies on a median, vertical line of the strut and is vertically alined with a similar point, P–2 when the lever is set in right-hand position between flange 12 and its parallel plate 19. To put it in other words, the operative position of the strut is such that whether the strut is used for support of a left-hand lever or the right-hand lever, the lever in each case will be fulcrumed in the same relative position to the body of the strut along a central vertical line passing through said points P–1 and P–2.

That the feature is important will be appreciated by realizing that a placement of the fulcrum of the lever laterally to one side of the longitudinal axis of the strut might increase the pull of the lever on the beam to one side of the strut and diminish it on the beam to the other side of the strut, and, thus, result in an unbalanced braking action of the shoes carried by the beam. It is to avoid this result that the levers in my strut are fulcrumed in the manner described above.

After having described my improvement, what I wish to claim is as follows:

1. A brake beam strut comprising an elongated rail, including a pair of flanges disposed in right angular relation with respect to each other and the apex of said rail in the operative position thereof being in a horizontal plane, with the upper and lower flanges being each disposed at an angle of 45° thereto, an elongated plate disposed in spaced parallel relation to each flange, said plates being equally spaced from the respective flanges and are in right angular relation to each other, each flange and its corresponding plate being provided with aligned apertures, the aligned apertures in each flange and its plate being adapted to receive a pin for pivotal support of a brake beam lever, the pivotal axis of the lever between one flange and its parallel plate being at right angles to the pivotal axis of the lever when mounted between the other flange and its parallel plate, transverse walls connecting the opposite ends of the rail and the said cooperating elongated plates to provide a unitary rigid structure, the longitudinal axis of the strut, and the axis of the pin and the longitudinal axis of the brake lever all intersecting at the same point, irrespective of whether the lever is in a right hand or left hand position.

2. The structure according to claim 1 wherein said strut further comprises a rectangular box-like member at one end thereof for receiving the brake beam, the opposite end of the strut being provided with a member having a horizontal elongated opening therein for receiving the crotch portion of a V-shaped rod.

References Cited in the file of this patent

UNITED STATES PATENTS

| | | |
|---|---|---|
| 759,302 | McMillan | May 10, 1904 |
| 814,865 | McGee | Mar. 13, 1906 |
| 983,799 | Applebaugh et al. | Feb. 7, 1911 |
| 1,112,125 | Ebbs | Sept. 29, 1914 |
| 2,085,469 | Paterson | June 29, 1937 |
| 2,348,147 | Pringle | May 2, 1944 |